United States Patent [19]

Haigh et al.

[11] Patent Number: 4,746,249
[45] Date of Patent: May 24, 1988

[54] PUMPABLE BACKFILL MATERIAL OF HIGH STRENGTH

[75] Inventors: Jeffrey G. Haigh, Coleshill, England; Andrew J. Marsh, Alberton, South Africa

[73] Assignee: Fosroc International Limited, Birmingham, England

[21] Appl. No.: 881,380

[22] Filed: Jul. 2, 1986

[30] Foreign Application Priority Data

Jul. 4, 1985 [GB] United Kingdom ............... 8516961

[51] Int. Cl.$^4$ .................. E02D 3/00; E02D 15/00
[52] U.S. Cl. .................................. 405/264; 106/90; 299/11; 405/267
[58] Field of Search ............... 405/128, 258, 263, 264, 405/267, 288, 129; 299/11; 106/90, 97, DIG. 1, DIG. 4

[56] References Cited

U.S. PATENT DOCUMENTS

| | | | |
|---|---|---|---|
| 3,508,407 | 4/1970 | Booth | 405/264 |
| 3,642,509 | 2/1972 | Fujimasu | 405/264 X |
| 3,799,787 | 3/1974 | Davis | 405/267 X |
| 3,920,795 | 11/1975 | Selmeczi et al. | 405/264 X |
| 4,019,327 | 4/1977 | Kempster | 405/264 |
| 4,101,333 | 7/1978 | Wayment | 405/267 X |
| 4,257,814 | 3/1981 | Kellett et al. | 405/267 X |

FOREIGN PATENT DOCUMENTS

| | | |
|---|---|---|
| 419561 | 10/1925 | Fed. Rep. of Germany . |
| 2006512 | 8/1971 | Fed. Rep. of Germany . |
| 2724599 | 12/1978 | Fed. Rep. of Germany ...... 405/263 |
| 2143389 | 2/1973 | France .................. 405/267 |
| 36218 | 3/1980 | Japan .................. 405/263 |
| 41119 | 7/1958 | Poland .................. 405/267 |
| 907043 | 10/1962 | United Kingdom . |
| 589443 | 1/1978 | U.S.S.R. .................. 405/267 |
| 746125 | 7/1980 | U.S.S.R. .................. 405/267 |

Primary Examiner—David H. Corbin
Attorney, Agent, or Firm—Caesar, Rivise, Bernstein, Cohen & Pokotilow, Ltd.

[57] ABSTRACT

An aqueous slurry of backfill material e.g. slimes, includes a settable material and an activator therefor, e.g. pulverized fuel ash and lime, and a lubricant e.g. clay and a plasticizer, e.g. a lignosulphonate so that the slurry can be pumped over long distances but will then set to develop high early strength.

10 Claims, 1 Drawing Sheet

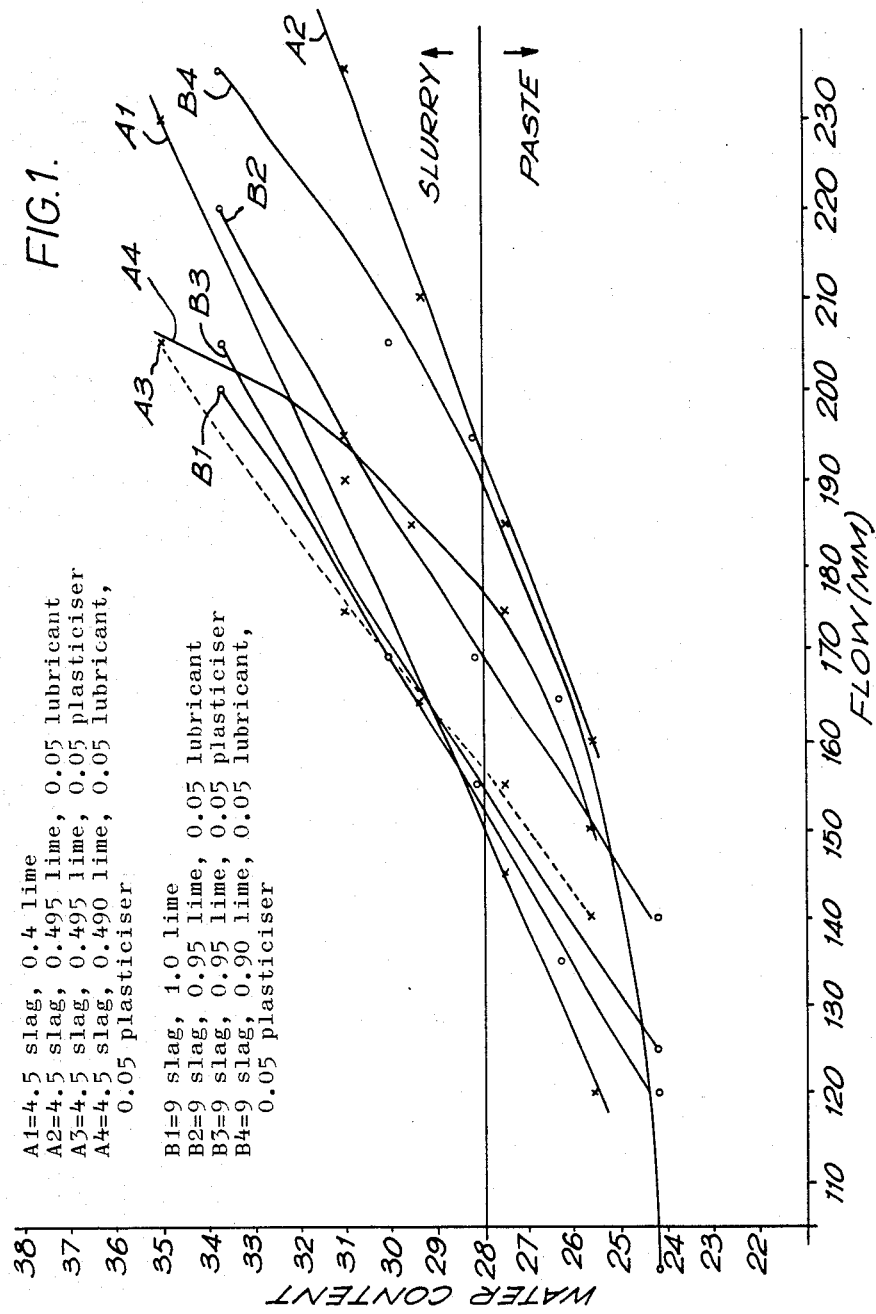

PUMPABLE BACKFILL MATERIAL OF HIGH STRENGTH

The invention relates to a pumpable material for use in forming a backfill of high strength useful in a variety of mining and tunnelling applications. A backfill material is used to fill excavations in mining, as in "cut and fill" mining, in general steep dipping ore bodies or in wide horizontal bodies where the fill is used as the means of creating a floor and a sidewall pillar support. For example, when ore is extracted from a mine, pillars of ore-material are left to support a roof. Later the space between adjacent pillars may be filled by a backfill to support the roof so allowing the pillars to be removed for the valuable ore therein to be extracted.

It is known to place an aqueous slurry of the fines from the crushing and processing of mineral ore as a backfill material. The slurry used is normally 65 to 75% solids, made of particles less than 150 micron, the majority below 75 micron, and the water being contaminated with mineral processing reagents, for example cyanides. The fines may be made up of so called tailings from the processed ore, and may be for example reduction works tailings, mill tailing sands, and coal dust tailings. The slurry is pumped for a distance or perhaps three kilometers from where the slurry is prepared. Unfortunately in order to make the slurry pumpable it is necessary to add a high proportion of water and this, combined with the uncontrolled nature of the solids, means that the backfill is liable to shrinkage when dewatering and to a high degree of compaction or deflection before offering significant resistance to compression. As a result, it is necessary to add additives to the backfill. For example, it has been proposed to add ordinary Portland Cement to the slurry. This is not satisfactory for various reasons for example shrinkage, lack of initial stiffness, possible deterioration in strength due to sulphate attack and cost. Other additives include coal fly ash and blast furnace slag activated by lime.

It is one object of the invention to provide an additive to be incorporated in a pumpable slurry of a backfill material so that the formed backfill will have improved strength. A more specific object of the invention is to provide such an additive the use of which will enable the slurry to be pumped over a long distances to provide a backfill structure having a predetermined compressive strength after a relatively short time interval.

According to one aspect of the invention there is provided a pumpable backfill slurry, comprising the fines derived from the treatment of ore bearing rocks, and water; and an additive comprising
  a settable reinforcing material, having a rate of setting such that the material will not set while the slurry is being pumped, the concentration of the reinforcing material being selected to cause the placed backfill to have load bearing properties,
  a lubricant to facilitate the pumpability of the slurry,
  a plasticiser to exert a plasticising effect on the solids of the slurry,
  the concentration of the lubricant and the plasticiser being selected so that the slurry may readily be pumped.

While the settable reinforcing material may be selected from a wide range of slow setting materials it is preferred to use a material which will not set prematurely while the slurry is being pumped irrespective of the concentration in the slurry. Our evaluations have shown that it is much preferred that the material be a pozzolanic material. This may contain silica or alumina to reach with an activator such as lime to form a hydrated calcium or aluminosilicate. The pozzolanic material may be a pulverised volcanic ash, pulverised fuel ash, pulverised blast furnace slag, pulverised burnt clay, rice husk ash, calcined diatomite or calcined bauxite.

The activator for the pozzolanic material is lime which may be added as hydrated lime or formed in situ. The pozzolan when set ensures that the backfill attains a compressive strength of the order of $5N/mm^2$ in about 3 months which is unusually high for a pozzolanic material.

It is an advantageous feature of the invention that the water content of the pumpable can be low, say below about 28% water content, and yet be pumpable. Such a composition tends to be a thick slurry, rather like a paste, which can be pumped to flow in non-turbulent matter and will set in layers, so forming a set material substantially free of weakening voids.

The lubricant is preferably a clay, especially an expanding clay, which will absorb or carry free water in the slurry and facilitate easy pumping.

The plasticiser is preferably a dispersing agent, preferably a high molecular weight material such as sulphonated naphthalenes, melamine formaldehydes and lignosulphonates, present in sufficient quantity to wet the particles of fines.

The concentration of the lubricant, and the plasticiser will be selected to be the minimum necessary for their respective purposes. The upper limit will be below the level at which the presence of these ingredients will affect the strength of the set material.

By virtue of the presence of the additive of the invention the slurry may be pumped without adverse effect over prolonged distances using readily available pumps and pipelines.

The additive is of especial value in relation to backfills formed of fines which have little or poor strength. Such fines may be known as "slimes" as in gold slimes which are typically acidic as a result of the processing treatment; sand tailings; coal slurries; ores and waste. Analyses of two gold mine slimes are as follows:

| Sieve grading: (% by weight) | | |
|---|---|---|
| less than 300 micron | 1.81 | 5.43 |
| −300 to +150 micron | 3.22 | 20.43 |
| −150 to +106 micron | 17.89 | 15.68 |
| −106 to +75 micron | 24.23 | 35.06 |
| −75 to +63 micron | 13.64 | 0.50 |
| −63 to 45 micron | 13.64 | 0.82 |
| greater than 45 micron | 20.50 | 22.08 |
| X-ray scan | mainly silicon peak, minor peaks for Al, S, Ca, Fe | |
| Cyanide content as $CN^-$ (including complex cyanides) mg/kg | 6.3 | 1.8 |
| sulphate content as $SO_3$ | 0.00 | 0.23 |
| ash content at 450° C. | 96.98 | 98.74 |
| ash content at 900° C. | 96.30 | 97.99 |

As indicated, the backfill or the slurry may contain reagents from the mineral processing, examples being cyanides, sulphides and the like. The method of the invention is capable of use even when such reagents are present because the additives herein are inert with respect thereto i.e. they function even when such reagents are present because the additives herein are inert with respect thereto i.e. they function even when such reagents are present.

A backfill formed using a slurry containing the additive of the invention is of particular value in situations where the backfill is used to support a roof which would otherwise tend to collapse. A backfill of the invention may be placed between the pillars left in a mine and when the backfill has attained its predetermined compressive strength, the pillars may be removed to extract the valuable ore therein. Because the backfill supports the roof and takes up the mining induced stresses therein, the pillards are in a less stressed condition and can be removed under normal procedures.

The invention includes the additive per se.

The invention is illustrated by the following examples.

EXAMPLE 1

Gold ore treatment slimes comprise fines having a random size distribution, the majority being below 75 micron, and water recovered from mineral processing plant. To 675 g of the fines and 225 g of the water making up the slime was added a dry mixture of 90 g pulverised fuel ash
9 g hydrated lime
0.5 g expanding clay
0.5 g plasticiser The slurry was pumped over distances of the order of 5 kilometers.

A test cube of the set material was tested for compressive strength which was found to be 3N/mm$^2$ after 21 days. The deflection under load was evaluated and was found to be 2% at 20 KN load.

EXAMPLE 2

Sample slurries were made up in the laboratory using slimes from the gold mine. The concentration of the ingredients was varied. The flow properties of the slurries were measured by placing a standard sample in a cone shaped container and then releasing the material from the container; the distance of spread in millimeters over a period was measured. It was determined that a flow of about 180 mm in the test was indicative of the ability of the slurry to be pumped along a distance of at least two kilometers. (In some cases the slurry was so fluid that the spread was wide and so the time to empty the container was measured in seconds instead). A test block of each slurry was allowed to set, and 24 hours later an attempt was made to penetrate the block using a blunt needle. The result was recorded as a force in MPa, a higher result indicating that the block had a higher early strength. The formulations used, and the results obtained are recorded in the Tables. It will be noted that to obtain the required level of flow and a water content in the slurry not exceeding about 28% by weight and form a test block having good strength after 24 hours it was necessary to add both the lubricant and the plasticiser to the slimes slurry.

EXAMPLE 3

Using selected slurries identified in the Table according to Example 2, the flow measurements were plotted against water content and the results are shown in the graph of FIG. 1. It will be seen that at a water content of about 28%, and an additive content of 0.5% or 1%, a flow measurement of from about 180 to 190 mm is achieved. The slurry tends to be more of a paste as the water content is decreased, as a result of which the slurry flows when pumped in a non-turbulent manner, and settles and sets when placed without the formation of weakening voids.

TABLE 1

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| slimes | 74.40 | 74.40 | 74.40 | 74.40 | 72.30 | 72.30 | 72.30 | 72.30 | 70.0 | 70.0 | 70.0 | 70.0 | 69.4 | 69.4 |
| slag | 4.50 | 4.50 | 4.50 | 4.50 | 4.50 | 4.50 | 4.50 | 4.50 | 4.50 | 4.50 | 4.50 | 4.50 | 4.50 | 4.50 |
| water | 20.60 | 20.60 | 20.60 | 20.60 | 22.70 | 22.70 | 22.70 | 22.70 | 25.00 | 25.00 | 25.00 | 25.00 | 25.60 | 25.60 |
| lime | 0.5 | 0.495 | 0.495 | 0.49 | 0.5 | 0.495 | 0.495 | 0.5 | 0.5 | 0.495 | 0.495 | 0.49 | 0.5 | 0.495 |
| lubricant | 0.0 | 0.05 | 0.0 | 0.05 | 0.0 | 0.05 | 0.0 | 0.05 | 0.0 | 0.05 | 0.0 | 0.05 | 0.0 | 0.05 |
| plasticiser | 0.0 | 0.0 | 0.05 | 0.05 | 0.0 | 0.0 | 0.05 | 0.05 | 0.0 | 0.0 | 0.05 | 0.05 | 0.0 | 0.0 |
| flow (mm) | 125 | 135 | 120 | 145 | 145 | 155 | 145 | 170 | 175 | 175 | 170 | 180 | 120 | 160 |
| penetration MPa/ | 1.90 | 1.16 | N/A | 0.70 | 1.00 | 0.83 | N/A | 0.33 | 0.83 | 0.50 | N/A | 0.23 | 1.67 | 0.20 |

| | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| slimes | 69.4 | 69.4 | 68.0 | 68.0 | 68.0 | 68.0 | 67.5 | 67.5 | 67.5 | 67.5 | 66.0 | 66.0 | 66.0 | 66.0 |
| slag | 4.50 | 4.50 | 4.50 | 4.50 | 4.50 | 4.50 | 4.50 | 4.50 | 4.50 | 4.50 | 4.50 | 4.50 | 4.50 | 4.50 |
| water | 25.60 | 25.60 | 27.00 | 27.00 | 27.00 | 27.00 | 27.50 | 27.50 | 27.50 | 27.50 | 29.00 | 29.00 | 29.00 | 29.00 |
| lime | 0.495 | 0.49 | 0.5 | 0.495 | 0.495 | 0.49 | 0.5 | 0.495 | 0.495 | 0.49 | 0.5 | 0.495 | 0.495 | 0.49 |
| lubricant | 0.0 | 0.05 | 0.0 | 0.05 | 0.0 | 0.05 | 0.0 | 0.05 | 0.0 | 0.05 | 0.0 | 0.05 | 0.0 | 0.05 |
| plasticiser | 0.05 | 0.05 | 0.0 | 0.0 | 0.05 | 0.05 | 0.0 | 0.0 | 0.05 | 0.05 | 0.0 | 0.0 | 0.05 | 0.05 |
| flow (mm) | 40 | 155 | 200 | 205 | 210 | 210 | 145 | 185 | 155 | 175 | 220 | 230 | 235 | 34 |
| penetration MPa/ | 0.66 | 0.33 | 0.33 | 0.17 | N/A | 0.17 | 1.00 | 0.13 | N/A | 0.13 | 0.17 | 0.07 | N/A | 0.70 |

| | 29 | 30 | 31 | 32 | 33 | 34 | 35 | 36 | 37 | 38 | 39 | 40 | 41 | 42 |
|---|---|---|---|---|---|---|---|---|---|---|---|---|---|---|
| slimes | 65.6 | 65.6 | 65.6 | 65.6 | 65.6 | 64.00 | 64.00 | 64.00 | 64.00 | 64.00 | 64.00 | 64.00 | 60.00 | 60.00 |
| slag | 4.50 | 4.50 | 4.50 | 4.50 | 4.50 | 4.50 | 4.50 | 4.50 | 4.50 | 4.50 | 4.50 | 4.50 | 4.50 | 4.50 |
| water | 29.40 | 29.40 | 29.40 | 29.40 | 31.00 | 31.00 | 31.00 | 31.00 | 31.00 | 31.00 | 31.00 | 31.00 | 35.00 | 35.00 |
| lime | 0.5 | 0.495 | 0.495 | 0.49 | 0.5 | 0.495 | 0.495 | 0.49 | 0.5 | 0.495 | 0.495 | 0.49 | 0.5 | 0.495 |
| lubricant | 0.0 | 0.05 | 0.0 | 0.05 | 0.0 | 0.05 | 0.0 | 0.05 | 0.0 | 0.05 | 0.0 | 0.05 | 0.0 | 0.05 |
| plasticiser | 0.0 | 0.0 | 0.05 | 0.05 | 0.0 | 0.0 | 0.05 | 0.05 | 0.0 | 0.0 | 0.05 | 0.05 | 0.0 | 0.0 |
| flow (mm) | 165 | 210 | 165 | 185 | 190 | 235 | 175 | 195 | 47* | 40* | 23* | | 230 | 32* |
| penetration MPa/ | 0.53 | 0.03 | 0.13 | 0.07 | 0.27 | 0.00 | 0.17 | 0.03 | 0.03 | 0.03 | N/A | 0.03 | 0.03 | 0.00 |

| | 43 | 44 | 45 | 46 | 47 | 48 | 49 | 50 | 51 | 52 | 53 | 54 | 55 | 56 |
|---|---|---|---|---|---|---|---|---|---|---|---|---|---|---|

TABLE 1-continued

| | | | | | | | | | | | | | | |
|---|---|---|---|---|---|---|---|---|---|---|---|---|---|---|
| slimes | 60.00 | 60.00 | 70.0 | 70.0 | 70.0 | 70.0 | 61.90 | 69.10 | 69.10 | 69.10 | 56.30 | 56.30 | 56.30 | 56.30 |
| slag | 4.50 | 4.50 | 4.50 | 4.50 | 4.50 | 4.50 | 9.00 | 9.00 | 9.00 | 9.00 | 9.00 | 9.00 | 9.00 | 9.00 |
| water | 35.00 | 35.00 | 38.50 | 38.50 | 38.50 | 38.50 | 28.10 | 28.10 | 28.10 | 28.10 | 33.70 | 33.70 | 33.70 | 33.70 |
| lime | 0.495 | 0.49 | 0.5 | 0.495 | 0.495 | 0.49 | 1.0 | 0.95 | 0.95 | 0.9 | 1.0 | 0.95 | 0.95 | 0.90 |
| lubricant | 0.0 | 0.05 | 0.0 | 0.05 | 0.0 | 0.05 | 0.0 | 0.05 | 0.0 | 0.05 | 0.0 | 0.05 | 0.0 | 0.05 |
| plasticiser | 0.05 | 0.05 | 0.0 | 0.0 | 0.05 | 0.05 | 0.0 | 0.0 | 0.05 | 0.05 | 0.0 | 0.0 | 0.05 | 0.05 |
| flow (mm) | 205 | 205 | 16* | 19* | 20* | 17* | 155 | 170 | 155 | 155 | 200 | 220 | 205 | 225 |
| penetration MPa/ | 0.07 | 0.02 | 0.00 | 0.00 | 0.02 | 0.0 | 0.80 | 0.30 | 0.40 | 0.20 | 0.13 | 0.07 | 0.09 | 0.05 |

| | 57 | 58 | 59 | 60 | 60 | 61 | 62 | 63 | 64 |
|---|---|---|---|---|---|---|---|---|---|
| slimes | 58.0 | 58.0 | 58.0 | 58.0 | 58.00 | 52.50 | 52.50 | 52.50 | 52.50 |
| slag | 9.00 | 9.00 | 9.00 | 9.00 | 13.50 | 13.50 | 13.50 | 13.50 | 13.50 |
| water | 27.00 | 27.00 | 27.00 | 27.00 | 27.00 | 32.50 | 32.50 | 32.50 | 132.50 |
| lime | 1.5 | 1.495 | 1.495 | 1.49 | 1.49 | 1.50 | 1.495 | 1.495 | 1.49 |
| lubricant | 0.0 | 0.05 | 0.0 | 0.05 | 0.05 | 0.0 | 0.05 | 0.0 | 0.5 |
| plasticiser | 0.0 | 0.0 | 0.05 | 0.05 | 0.05 | 0.0 | 0.0 | 0.05 | 0.05 |
| flow (mm) | 140 | 155 | 145 | 175 | 175 | 205 | 205 | 190 | 220 |
| penetration MPa/ | 1.99 | 0.42 | 0.73 | 0.50 | 0.50 | 0.67 | 0.10 | 0.10 | 0.10 |

N/A = measurements not taken so results not available
*flow so fast that the speed of flow measured by time in seconds.

We claim:

1. A pumpable backfill slurry for use in forming a load bearing backfill in mining or tunnelling, comprising the fines derived from the treatment of ore bearing rocks, and water; and an additive comprising a settable pozzolanic reinforcing material in a concentration which will cause the placed backfill to have load bearing properties, a lubricant to facilitate the pumpability of the slurry, and a plasticizer to exert a plasticizing effect on the solids of the slurry, the concentration of the lubricant and the plasticizer being selected so that the slurry may readily be pumped and in which the water comprises up to about 28% by weight of the slurry, whereby a paste like slurry is formed, which will flow in a non-turbulent manner when pumped and wherein said slurry will set in layers to form a set material substantially free of weakening voids.

2. A slurry according to claim 1, characterised in that the lubricant is a clay.

3. A slurry according to claim 2, characterised in that the clay is an expanding clay.

4. A slurry according to claim 1, characterised in that the plasticiser is a high molecular weight polymer.

5. A slurry according to claim 4, characterised in that the plasticiser is a lignosulphonate.

6. A slurry according to claim 1, characterised in that the pozzolanic material is a pulverised blast furnace slag, pulverised burnt clay, rice husk ash, calcined diatomite or calcined bauxite.

7. A slurry according to claim 1, characterised in that an activator for the pozzolanic material is present and the activator is lime which may be added as hydrated lime or formed in situ.

8. A slurry according to claim 1, characterised in that the fines are selected from slimes; sand tailings; coal slurries; ores and waste.

9. A method for backfilling characterized by pumping a slurry, said method involving providing a slurry comprising the fines derived from the treatment of ore bearing rocks, and water; and an additive comprising a settable pozzolanic reinforcing material, having a rate of setting such that the material will not set while the slurry is being pumped, the concentration of the reinforcing material being selected to cause the placed backfill to have load bearing properties, the slurry including a lubricant to facilitate the pumpability of the slurry, a plasticizer to exert a plasticizing effect on the solids of the slurry, the concentration of the lubricant and the plasticizer being selected so that the slurry may readily be pumped, said method further involving pumping said slurry and allowing the pumped and dispensed backfill to set in layers to form a set material substantially free of weakening voids.

10. The method according to claim 9, characterized in that the slurry is pumped for a distance of about 5 Kilometers.

* * * * *